United States Patent [19]

Lee

[11] 4,357,033
[45] Nov. 2, 1982

[54] INERTIA ACTUATED ANTIDIVE SYSTEM FOR VEHICLE

[75] Inventor: Bert Lee, Salt Lake City, Utah

[73] Assignee: Metron Logging, Inc., Edmond, Okla.

[21] Appl. No.: 155,416

[22] Filed: Jun. 2, 1980

[51] Int. Cl.$^3$ .............................................. B60G 17/04
[52] U.S. Cl. .................................... 280/703; 280/714; 267/64.16
[58] Field of Search ....................... 280/703, 714, 6 H; 267/65 D

[56] References Cited

U.S. PATENT DOCUMENTS

| | | | |
|---|---|---|---|
| 2,954,237 | 9/1960 | Sampietro | 280/703 |
| 3,537,715 | 11/1970 | Gualdoni | 280/703 |
| 3,810,650 | 5/1974 | Hudson | 280/703 |
| 3,945,664 | 3/1976 | Hiruma | 280/703 |

Primary Examiner—Robert R. Song
Attorney, Agent, or Firm—Drummond, Nelson & Nissle

[57] ABSTRACT

A system for preventing the forward portion of a vehicle from downwardly pitching toward the road during braking of the vehicle. The vehicle includes a frame and a suspension system mounted on the frame for carrying a plurality of ground engaging wheels and for maintaining the frame in a generally level attitude during normal driving conditions. The braking system generally maintains the vehicle frame in its normal level attitude during the braking of the vehicle and comprises at least one hydraulic press adapted to interconnect the forward portion of the frame with the suspension system and having at least one chamber containing pressurized fluid, and a mechanism which maintains the fluid in the chamber at a normal operational pressure and is responsive to the deceleration of the vehicle to increase the pressure of the fluid above the normal operational pressure. An increase in the fluid operational pressure expands the hydraulic press to upwardly displace the forward portion of the frame with respect to the suspension system.

2 Claims, 3 Drawing Figures

INERTIA ACTUATED ANTIDIVE SYSTEM FOR VEHICLE

This invention relates to an auxiliary automotive system for preventing the forward portion of a vehicle from downwardly pitching toward the road during braking of the vehicle.

More particularly, the invention pertains to a pitch control system which maintains a vehicle in its normal generally level attitude during braking thereof and permits a more controlled, stable stop, particularly during rapid deceleratin of the vehicle.

In another respect, the instant invention concerns an auxiliary automotive pitch control system which generally preserves the normal distribution of the weight of a vehicle among the tires thereof during braking of the vehicle.

In a further and more specific respect, the invention relates to an auxiliary automotive pitch control system which both maintains the body of an automobile in its normal operative position during braking and performs the function of an ordinary shock absorber during normal driving conditions.

In still another further and more specific respect, the instant invention concerns an auxiliary automotive pitch control system which may be readily and conveniently installed on an existing motor vehicle.

Automobiles and motor vehicles in general are equipped with suspension systems which stabilize the body of the vehicle in a relatively fixed, level attitude during normal driving conditions and which absorb minor bumps encountered when driving along a highway. However, standard suspension systems are not designed to maintain the body of a vehicle in its normal level attitude during sudden stops. As a result, during rapid deceleration the forward end of an automobile dips toward the road and a compressive force is generated which causes the front wheels of the vehicle to bear a disproportionate amount of the forward inertia of the vehicle. This is an undesirable and dangerous condition because when a large portion of the forward inertia of the automobile is shifted onto the front wheels, the driver's ability to maneuver the vehicle is severly reduced and the car may swerve, roll or otherwise move out of control.

The tendency of an automobile to "nose down" during sudden stops can be somewhat minimized by installing heavyduty shock absorbers. However, since shock absorbers are designed to absorb relatively minor bumps in a road, even so-called "stiff" shock absorbers will not prevent the downward pitching of the front end of an automobile during rapid high-speed stops. Accordingly, it would be highly advantageous to provide an auxiliary automotive system which would maintain the normal attitude of the body of a vehicle during sudden stops.

Therefore, it is a principal object of the present invention to provide an auxiliary pitch control system which will maintain a vehicle in its normal level attitude during rapid deceleration of the vehicle.

A further object of the invention is to provide an auxiliary pitch control system for a vehicle which preserves normal distribution of the weight of the vehicle among the wheels thereof during braking of the vehicle.

Another object of the invention is to provide an auxiliary pitch control system which improves the ability of a driver to maintain control of the vehicle during deceleration thereof.

Still a further and more specific object of the instant invention is to provide an auxiliary automotive pitch control system which both maintains the normal attitude of a vehicle during sudden stops and performs the function of a shock absorber during normal driving conditions.

Yet another object of the present invention is to provide a pitch control system which is readily and conveniently installed on an existing vehicle.

These and other, further and more specific objectives and advantages of the invention will be apparent to those skilled in the art from the following detailed description thereof, taken in conjunction with the drawings, in which.

Briefly, in accordance with the invention, I provide a system for preventing the forward portion of a vehicle from downwardly pitching toward the road during braking of the vehicle. The vehicle includes a frame, a primary mover for the vehicle mounted on the frame, a suspension system mounted on the frame for carrying a plurality of ground engaging wheels and for maintaining the frame in a generally level attitude during normal driving conditions, and means integrated with the frame and suspension system for checking the forward motion of the vehicle. The pitch control system generally maintains the vehicle frame in its normal level attitude during braking of the vehicle and comprises at least one hydraulic press adapted to interconnect the forward portion of the frame and of the suspension system and having at least one chamber containing a pressurized fluid, means carried on the frame for maintaining the fluid in the chamber at a normal operational pressure and responsive to the deceleration of the vehicle to increase the pressure of the fluid above the normal operational pressure. The increase in the fluid pressure expands the hydraulic press to upwardly displace the forward portion of the frame with respect to the suspension system.

Figure 1:
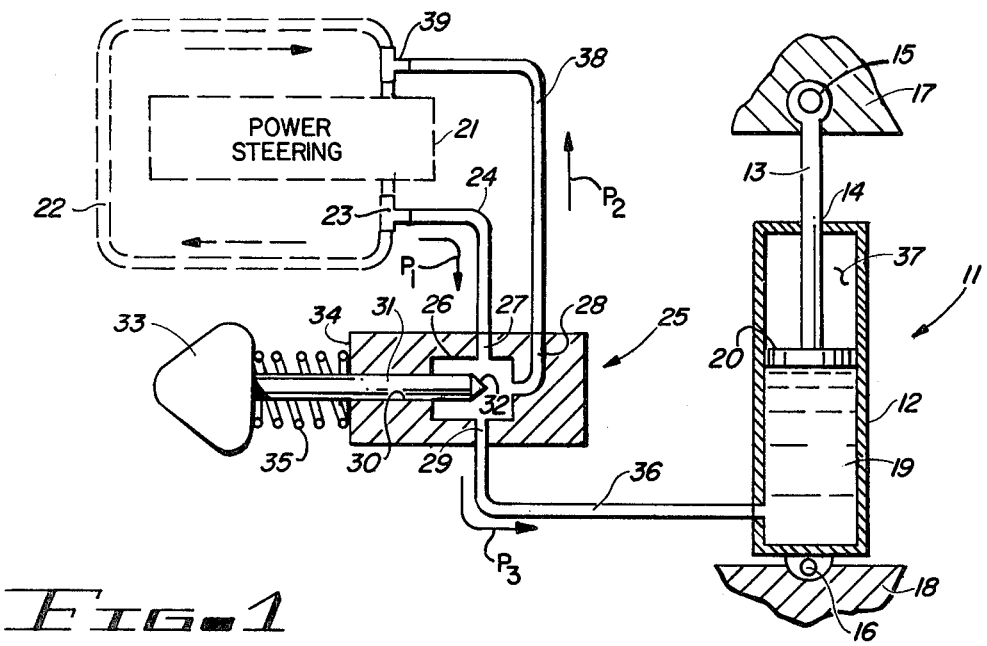
FIG. 1 is a partially cut away schematic view of an automotive pitch control system constructed in accordance with the presently preferred embodiment of the invention.
Figure 2:
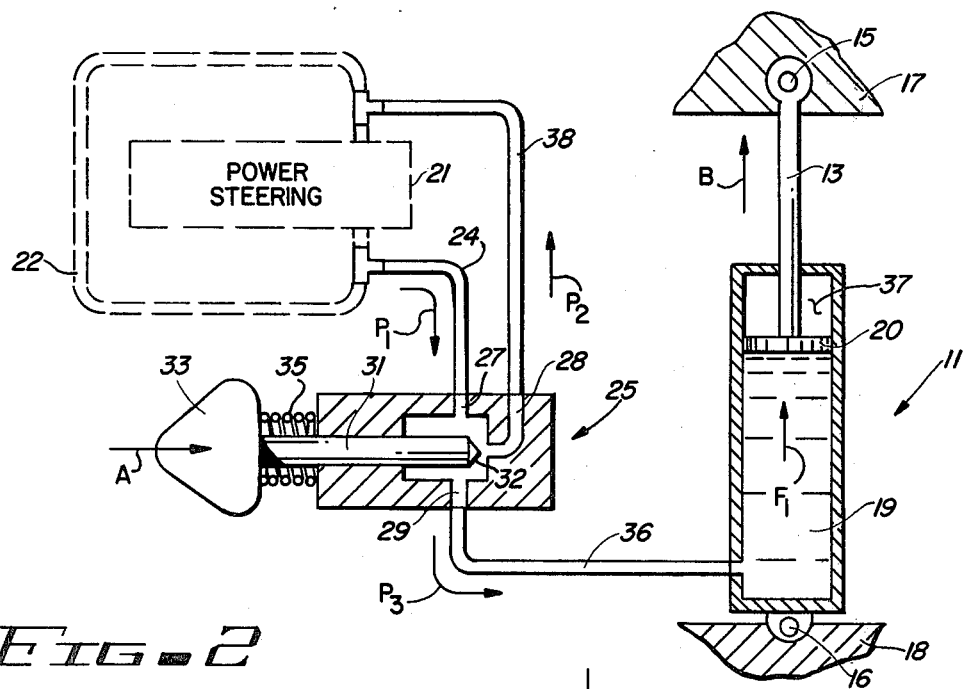
FIG. 2 is a partially cut away schematic view of the pitch control system of FIG. 1 illustrating the mode of operation thereof.

Turning now to the drawings, in which like reference numerals indicate corresponding elements in the several views, FIGS. 1 and 2 depict a pitch control system for a vehicle constructed in accordance with the presently preferred embodiment of the invention. The system consists of a hydraulic press 11 having piston 13 which upwardly extends through aperture 14 in cylinder 12. Bolts (not shown) are inserted through eyelets 15, 16 to attach hydraulic press to body frame 17 and suspension 18 of the vehicle. Pressure from hydraulic fluid 19 forces plunger 20 of piston 13 upward while compressed air 37 and the weight of frame 17 provide a counteracting force on the opposing side of plunger 20.

Pressure for hydraulic fluid 19 is drawn from the existing power steering system 21 of the automobile. Hydraulic fluid flowing through closed circuit 22 of power steering system 21 is side-streamed through T-joint 23 into high pressure line 24 leading to a two-way valve generally indicated by reference character 25. The inner chamber 26 of valve 25 has depending inlet channel 27, outlet channels 28, 29 and guide channel 30. Channel 30 slidably receives spindle 31 having tapered end 32. Chamber 26 and rod 31 are constructed such that during normal driving conditions, hydraulic fluid 19 entering chamber 26 through channel 27 flows through return channel 28 to the power steering hydraulic fluid lines 22. When the weight 33 and rod 31 are in the normal operative position shown in FIG. 1, a minor amount of fluid pressure, approximately 15 psi, is transmitted through orifice 29 and conduit 36 to maintain plunger 20 in position. Depending weight 33 of spindle 31 is forced away from surface 34 of valve 25 by spring 35. Fluid passing into chamber 26 is returned to hydraulic fluid conduits 22 of the power steering system 21 through conduit 28 and T-joint 39. Channel 29 and conduit 36 supply press 11 with hydraulic fluid.

In operation, during normal driving conditions weight 33 and rod 31 are positioned as shown in FIG. 1 and fluid entering chamber 26 through channel 27 flows through channel 28 and returns to the power steering hydraulic line 22 through conduit 38. However, a minor effective amount of fluid pressure, shown by arrow $P_3$, is transmitted through channel 29 and conduit 36 to maintain plunger 20 in midposition within casing 12. In the presently preferred embodiment of the invention, $P_3$ is approximately 15 psi. The normal pressure, shown by arrow $P_1$, of fluid flowing from the power steering system and entering chamber 26 through channel 27 is approximately 300 psi. Similarly, under normal operating conditions, the pressure of fluid returning to the power steering system 21, shown by arrow $P_2$, is approximately 300 psi.

As illustrated in FIG. 2, when a vehicle is rapidly decelerated the inertia of weight 33 causes weight 33 to travel in the direction of arrow A and to compress spring 35. As tapered end 32 moves toward the opening of channel 28, the flow of hydraulic fluid therethrough is restricted and diverted through conduit 36. The concomitant rise in the pressure $P_3$ of hydraulic fluid in conduit 36 causes hydraulic press 11 to expand and, as shown by arrow B, to upwardly displace frame 17 of the automobile from suspension system 18 such that the frame of the vehicle is maintained in its normal level attitude during braking of the vehicle. Obviously, the displacement of weight 33 and associated increase in the pressure $P_3$ of fluid in conduit 36 and casing 12 are proportional to the rate of deceleration of the vehicle. The greater the rate of deceleration, the greater the expansion of the hydraulic jack and displacement of the vehicle frame 17 from suspension 18. As would be appreciated by those skilled in the art, valve 25 and jack 11 can be constructed so they may be installed on a wide variety of vehicles and appropriately adjusted to maintain the normal level attitude of each particular vehicle during braking thereof.

Figure 3:
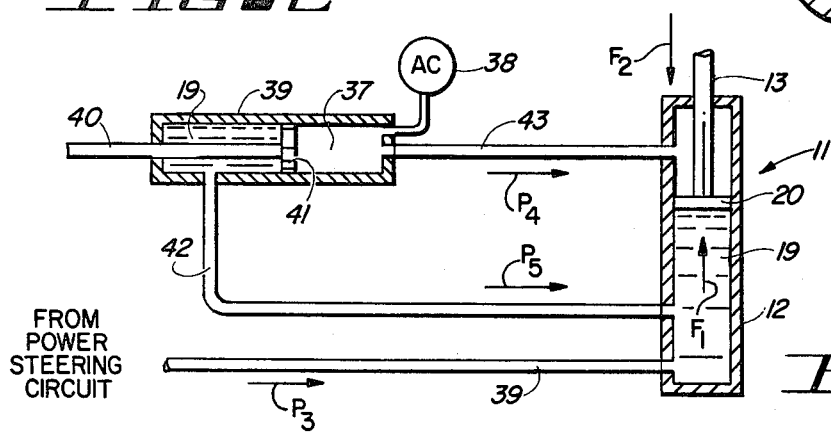
FIG. 3 is partially cut away schematic view of a damping mechanism incorporated into the pitch control system of FIG. 1.

During high-speed stops, piston shaft 13 of press 11 is compressed between force $F_1$ generated by the increase in the pressure of hydraulic fluid 19 and force $F_2$ generated by the weight of frame 17. The compressive stress received by shaft 13 is substantial and, during rapid high-speed stops, may cause the piston rod 13 found in a normal hydraulic press to buckle or shatter. In order to extend the useful life of hydraulic press 11 and reduce the likelihood of rod 13 being damaged, the damping system illustrated in FIG. 3 may be incorporated into an automobile pitch control system constructed in accordance with the invention. The damping system includes compressor 38 which maintains air 37 and hydraulic fluid 19 within chamber 39 at a minimal pressure of approximately 15 psi. Piston 40 having plunger 41 is utilized in chamber 39 to prevent air 37 from mixing with hydraulic fluid 19. Conduits 42 and 43 connect chamber 39 with hydraulic press 11. Under normal operating conditions the damping system of FIG. 3 permits press 11 to function like a shock absorber. When an automobile or other vehicle travels over a minor depression in the road, plunger 20 of press 11 will be vertically displaced and absorb the "shock" so the vehicle does not pitch or roll to one side or the other. After plunger 20 is initially displaced when the front wheels cross the depression in the road, equivalent pressures $P_4$ and $P_5$ on either side of plunger 20 restore the plunger to its original mid-point position within caising 12. During a sudden stop the air in pressure chamber 39 and lines 43 compresses to reduce the initial load borne by arm 13 when press 11 expands. For the sake of clarification, pressure relief valves normally installed in any pressurized system as a safety measure have been omitted from the drawings. The compressor 38 may be adapted for connection to the existing electrical system of the vehicle, be driven by a belt powered by the vehicle's primary mover, or be provided with its own self-contained power source.

As would be apparent to those skilled in the art, pressure for operating the hydraulic press 11 could, in place of cannibalizing pressure from the existing hydraulic lines of the power steering of a vehicle, be generated by an independent system mounted on the vehicle, and a variety or combination of fluids, including both liquids and gases, can be pressurized and utilized to expand press 11 during deceleration of a vehicle. Similarly, any of a number of mechanical or electrical systems could be substituted for valve 25 to increase the pressure $P_3$ to press 11 in response to deceleration of the vehicle. A particular benefit of the presently preferred embodiment of the invention is that it is readily installed on an existing vehicle by simply removing the forward shock absorbers and substituting a pair of hydraulic presses 11 therefor and by splicing conduits 24 and 38 from valve 25 into the existing lines 22 of power steering 21 with T-joints 23 and 39.

Both the pressure source and pressure regulating mechanism utilized in the presently preferred embodiment could be dispensed with by connecting conduit 36 from press 11 to a brake line of a vehicle. When the driver of the vehicle applied the brakes, the automatic increase in pressure $P_3$ to press 11 would upwardly displace rod 13 and frame 17 to maintain the body of the vehicle in a level attitude.

If lines 24 or 38 were blocked or the pressures $P_1$ and $P_2$ of fluid flowing in the lines were otherwise increased above the normal operating pressure, the power steering system 21 could be damaged. In order to minimize the probability of such damage a variety of conventional pressure relief systems could be installed which would direct excess fluid back into the power steering system or would otherwise reduce the fluid pressure to a normal operating level.

Having described my invention in such terms as to enable those skilled in the art to which it pertains to understand and practice it, and having described the presently preferred embodiments thereof.

I claim:

1. A system for preventing the forward portion of a vehicle from downwardly pitching toward the road during deceleration of the vehicle, said vehicle including a frame, a primary mover for said vehicle mounted on said frame, and a suspension system mounfted on said frame for carrying a plurality of ground engaging wheels and for maintaining said frame in a generally level attitude during normal driving conditions, said system generally maintaining said frame in said normal level attitude during deceleration of said vehicle and comprising (a) at least one hydraulic press adapted to interconnect the forward portion of said frame and said suspension system and having at least one chamber containing a pressurized fluid, (b) a source of hydraulic fluid, (c) means for pressurizing said source of hydraulic fluid, (d) a conduit connecting said hydraulic fluid source with said chamber of said hydraulic press, (e) a valve integrated along said conduit between said fluid source an said hydraulic press and having (i) a first operative position for maintaining a minimal operating pressure in said chamber of said hydraulic press when said vehicle is traveling at a constant speed, and (ii) second operative positions for allowing the fluid pressure in said chamber of said hydraulic press to increase on deceleration of said vehicle, said increase in fluid pressure expanding said press to upwardly displace said forward portion of said frame with respect to said suspension system, and being in proportion to the rate of deceleration of said vehicle such that the increase in fluid pressure is greater for greater rates of deceleration, (f) means for causing said valve to move from said first operative position to one of said second operative positions on deceleration of said vehicle, including, (i) a support member, (ii) a weight carried by said member and movable between at least two operative positions, a normal operative position, and a temporary secondary operative position, the inertia of said weight causing the weight to move from said normal operative position to said secondary operative position upon deceleration of said vehicle, (iii) resilient means for maintaining said weight in said normal operative position during travel of said vehicle at a constant speed and for returning said weight to said normal operative position after deceleration of said vehicle, and (iv) means for causing said valve to move from said first operative position to one of said second operative positions in proportionate response to the inertial movement of said weight from said normal operative position to said temporary secondary operative position, such that greater rates of deceleration of said vehicle cause the inertia of said weight to produce a greater displacement force, and allow a greater increase in fluid pressure in said chamber of said hydraulic valve.

2. The system of claim 1 including buffer means for minimizing the load initially carried by said hydraulic press on deceleration of said vehicle, including (a) a pressure accumulator having at least one fluid chamber containing fluid at a normal operational pressure, the fluid volume of said chamber increasing when the fluid pressure increases above said normal operational pressure, and (b) an auxiliary conduit interconnecting said chamber of said hydraulic press and said fluid chamber of said pressure accumulator, said pressure accumulator being formed to draw of a pre-selected amount of the increased pressure initially applied to said chamber of said hydraulic press on deceleration of said vehicle.

* * * * *